July 28, 1936.  W. R. POSTLEWAITE  2,048,948
HELICAL FEED DEVICE
Filed Aug. 28, 1934    2 Sheets-Sheet 1
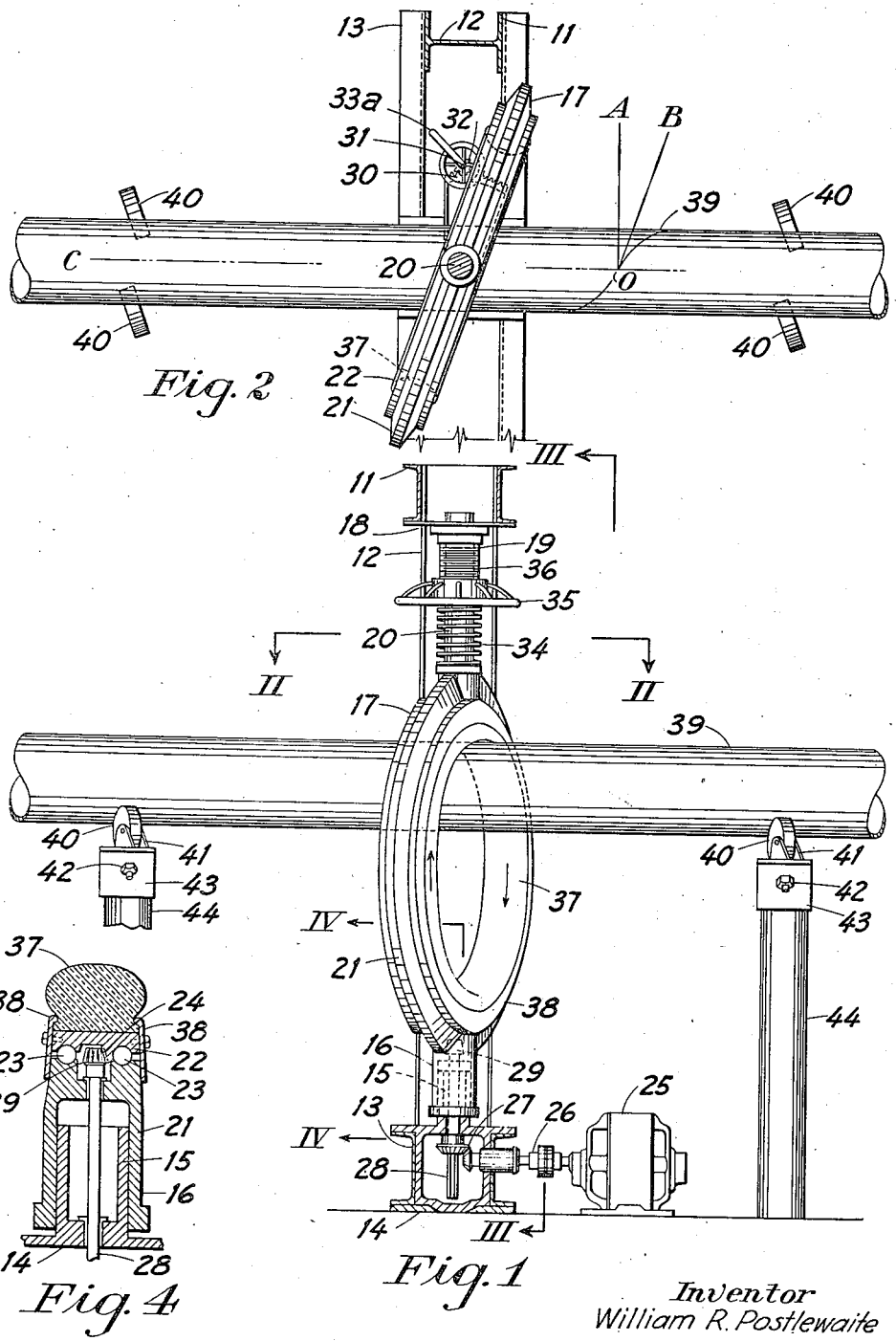
Inventor
William R. Postlewaite
By: J. N. Adams
Attorney July 28, 1936.   W. R. POSTLEWAITE   2,048,948
HELICAL FEED DEVICE
Filed Aug. 28, 1934   2 Sheets-Sheet 2

Inventor
William R. Postlewaite
By: J. N. Adams
Attorney

Patented July 28, 1936

2,048,948

UNITED STATES PATENT OFFICE 2,048,948

HELICAL FEED DEVICE

William R. Postlewaite, San Francisco, Calif., assignor to Standard Oil Company of California, San Francisco, Calif., a corporation of Delaware Application August 28, 1934, Serial No. 741,807

2 Claims. (Cl. 242—11)

This invention relates to an apparatus for imparting a uniform helical motion, or a combination of rotation and axial advancement, to cylindrical bodies such as pipes, tubes, posts, piles and the like. It is particularly useful as an adjunct to apparatus of well known types for applying coatings and wrappings to such bodies for protection against corrosion or other damage.

Heretofore machines for this purpose have involved the use of skewed or angularly directed rollers for supporting the cylindrical body and also for guiding or controlling its rate of longitudinal advance per turn of revolution. The means for revolving the body on the said skewed rollers has ordinarily been a flexible belt or a set of knurled or toothed discs. In some cases the rollers have been free to assume any position, and the helix angle of the motion has been determined by the angularity of the belt or belts with respect to the pipe axis.

There are numerous disadvantages to all of these, as the belts are prone to slip and, furthermore, have no longitudinal stiffness between their points of support on their drive pulleys and their contact with the cylindrical body, so that the belt may and often does weave backward and forward along the said body, producing irregular and non-uniform motion. The knurled disc devices are detrimental to primers and other coatings that may already be in place on the body, and are very sensitive to slight changes in diameter or roundness of the body, couplings, welds, and the like.

It is an object of this invention to provide an apparatus for imparting a uniform helical motion, which may be here defined as equivalent to a simultaneous rotation and axial advancement, to a cylindrical body.

Another object is to provide an apparatus for imparting a uniform helical motion to a cylindrical body, which motion may readily be controlled and altered as desired.

Another object is to provide an apparatus of this character which will not mar the surface or a coating upon the said cylindrical body, and which will not be put out of adjustment by relatively sudden and great changes in diameter or eccentricity of the body.

Another object is to provide an apparatus of this character which will be adapted to operate upon various diameters of cylinders with a minimum of adjustments and changes of parts.

These and other objects and advantages will become apparent from the description which follows and from the accompanying drawings, which form a part of this specification and illustrate a preferred embodiment of the invention.

In the drawings:

Figure 1 is a side elevation, partly in section, of a machine adapted to impart a helical motion to a length of pipe, for example, and illustrates the driving and guiding torus or ring which supplies and controls the said motion.

Figure 2 is a horizontal sectional view on line II—II of the device shown in Figure 1 and illustrates one form of helix angle adjusting mechanism.

Figure 4 is a section on line IV—IV of Figure 1 through the torus ring and its support, illustrating the guiding and driving means for the moving element.

Figure 5:
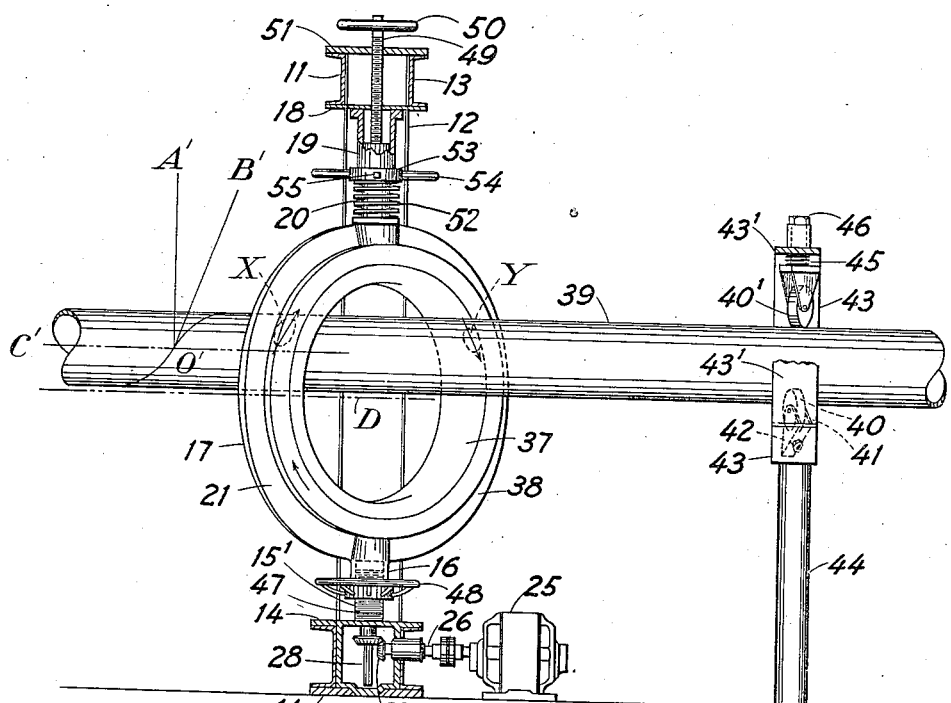
Figure 5 is a side elevation, partly in section, of an alternative arrangement of the device shown in Figure 1 and illustrates the guiding and driving torus ring in double contact with the pipe and vertically adjustable with respect to the skew roller supports for the pipe to control the helix angle thereof.

Referring to Figure 1, the rectangular frame 11 of the machine may be made up from rolled steel sections 12 and 13 which may be welded or bolted together in the conventional manner. A flanged box-like member 14 is provided in the center of the lower members 13 of frame 11 and has an upwardly extending cylindrical support 15 on which the lower socket 16 of the ring frame 17 is adapted to be rotatably received. A plate 18 is secured to the upper members of the frame 11 at the center thereof, and has a hollow shaft 19 extending vertically downwardly to provide a socket into which the upper pin 20 of ring frame 17 may be rotatively received. Ring frame 17 is thus supported at the top and bottom so that it may be turned to a desired degree about a vertical axis, subject to the control devices to be described in detail below.

Ring frame 17 is best illustrated in Figures 2 and 4 and comprises an outer stationary annular member 21, to which socket 16 and pin 20 are secured, and an inner rotating annular member 22 which is free to rotate coaxially with regard to member 21. Friction reducing devices such as the double row of ball bearings 23 may be provided, as shown. The inner member 21 is fitted with a beveled ring gear 24, which is positively driven by any source of power such as motor 25, through the shaft 26, bevel gears 27, splined shaft 28 and pinion 29. Inasmuch as splined shaft 28 passes through the axis of the bottom cylindrical support 15 for ring frame 17, power may be transmitted to rotate the inner ring member 22 within the ring frame 17 and with the latter in any position on its axis.

Figure 3:
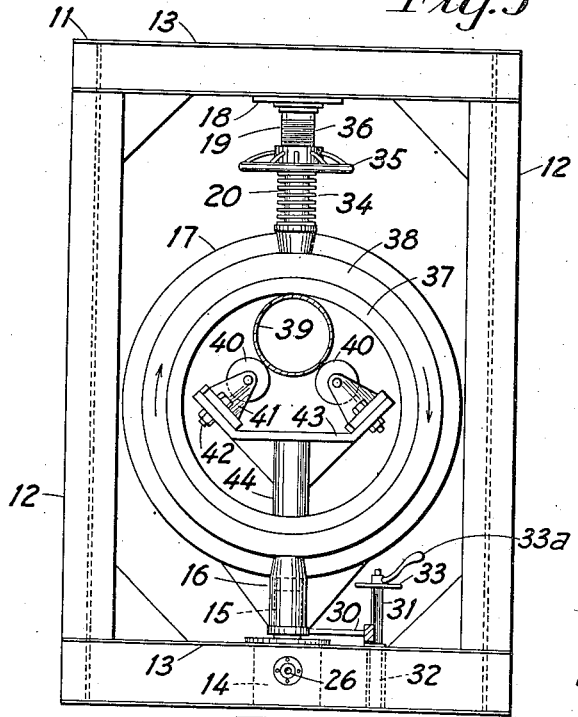
Figure 3 is a sectional elevation on line III—III of Figure 1 and illustrates the skew roller supports.

The angular position of ring frame 17 in regard to the frame 11, in the preferred embodiment shown in Figures 1, 2 and 3, may be predetermined and adjusted by the toothed quadrant 30 (Figure 2) which extends horizontally from the lower socket 16 of ring frame 11, and engages the long pinion 31 which is mounted on shaft 32 and is provided with a hand wheel 33 to facilitate its operation. A locking member 33a may be provided to maintain the adjustment of these parts. The ring frame 17 is also free to move bodily upwardly for a limited distance, under circumstances which will be described below, against the resistance of spring 34, which may be adjusted by hand wheel 35 threaded at 36 on the hollow shaft 19, which forms the upper guide and support for the said frame. Power to rotate inner ring member 22 is not affected by such motion due to the vertical freedom afforded by the splined shaft 28.

The inside face of inner ring member 22 is provided with a facing or tire 37 of rubber or similar elastic resilient friction material secured thereto and preferably reinforced by removable side flanges 38 which also act as oil seals for the annular ball bearing 23. The inner face of tire 37 engages the outer surface of the pipe or other cylindrical body 39 over an appreciable arc of contact, due to the fact that two concave surfaces are disposed at an angle to each other.

Pipe 39 is supported at substantially right angles to the plane of frame 11 upon skew idler rollers 40 which are journalled in pivoted yokes 41 (Figure 3) so as to be free to follow the helical motion of the said pipe, as determined by the angularity of the plane of ring 17 with respect to the pipe axis. If desired, yokes 41 may be fixed in this position, as by tightening the pivot bolts 42. Yokes 41 may be supported upon brackets 43 at each side of the pipe and below the same at the top of suitable posts 44.

The operation of the preferred device is believed to be readily observable from the preceding description and Figures 1, 2, 3 and 4 of the drawings. In the embodiment shown, the inner ring member 22 of torus ring frame 17 is set in rotation by motor 25 and is illustrated as turning in a clockwise direction as shown by the arrows on Figures 1 and 3. The helix angle of the helical motion to be imparted to the pipe 39 is adjusted to the desired value AOB, where OB is parallel to the plane of rotation of ring frame 17, by the hand wheel 33 actuating the pinion 31 and quadrant 30 and is locked by locking member 33a. The tire 37, being urged strongly downwardly against the top of the pipe 39 by spring 34, will cause the line of contact with the pipe 39 to follow its exact direction of travel relative thereto, and being rigidly supported by torus ring frame 17, will not permit appreciable deviation from that travel.

As couplings, welds, eccentricities of the pipe, and the like pass beneath the tire 37 of ring 17, the latter will be deflected upwardly or downwardly only against spring 34 and not axially relative to the pipe or about its own axis. Such deflections cannot cause pertinent deviations in the helix angle AOB between the plane of the torus driving ring 17 and a plane at right angles to the pipe axis C, so that the true helical motion caused thereby would not be materially altered.

Referring now to the modification of this invention as illustrated in Figure 5, it will be noted that the essential features of a torus driving ring 17 and skew idler rollers 40 are retained, the main difference being in the manner of adjusting or manipulating the torus ring 17 with regard to the pipe or cylindrical body 39 being handled, to control the helix angle. In this embodiment, the torus ring 17 does not bear directly downwardly on the pipe 39 but is twisted or rotated clockwise about its vertical axis so as to pinch the opposite sides of the pipe between the corresponding edges of the tire 37 which forms the rotating face of ring 17. The small areas of contact, indicated by the dotted areas X and Y are illustrated in Figure 5. These are substantially opposite each other but are both above the pipe axis C'.

The helix angle A'O'B' is controlled by the vertical displacement between the pipe axis C' and the axis of rotation D of ring 17. For example, if the two are in the same horizontal plane, the pipe 39 will be rotated only and will not advance longitudinally, as the opposite edges of the ring will be moving vertically, one upwardly and the other downwardly. As the vertical displacement between C' and D is increased, the longitudinal component of the helical motion will likewise increase, due to the curvature of the torus ring 17 and the changed relation of the two areas of contact X and Y on the surface of pipe 39.

In the mechanism shown there are but few changes from that already described. It will be obvious that an additional skew idler roller 40' will be desirable to hold the pipe 39 on the skew idler rollers 40, and such a construction would require the upward extension 43' of the bracket member 43 over the pipe 39. Skew idler roller 40' is preferably pressed downwardly against the pipe 39 by a spring 45 and is further provided with a long guide stem 46 to allow inequalities in the pipe to pass beneath roller 40'.

The mounting arrangement for torus ring 17 also requires some modification from that previously described. In order to provide accurate vertical positioning of the axis D of this ring, with regard to the pipe axis C', the lower support 15' may be threaded externally as at 47 and a correspondingly threaded hand wheel 48 fitted thereto, to lift the ring structure 17 as desired. Likewise, a threaded shaft 49 with a hand wheel 50 may be passed through a plate 51 at the top of frame 11 and extended through the hollow shaft 19 to position the upper end of pin 20 at the upper end of ring 17.

In order to urge the torus ring 17 clockwise about its vertical axis against the sides of pipe 39, a torsion spring 52 may be provided, with its lower end secured to pin 20 and its upper end secured to a collar 53 on hollow shaft 19. Collar 53 may be provided with spokes 54 for adjusting the spring torsion, and has a set screw 55 for securing it to shaft 19. Splined shaft 28, previously described, is adequate to permit such adjustments as may be necessary, without interfering with the transmission of power from motor 25 to the inner ring member 22 and tire 37. The toothed quadrant 30 and pinion 31 would not be required for this arrangement.

It would appear that the present invention includes the provision of a rotating torus ring in controlled angular contact with the outer surface of the cylindrical body to which a uniform, controlled, helical motion is to be imparted, together with suitable supporting means for the said body, permitting such helical motion, but preventing any other.

It will readily be seen that the essential features of this invention are embodied in the two arrangements described and illustrated above, although it is obvious that many further modifications and changes could also be made without departing therefrom.

I claim:

1. A helical feed device for a cylindrical body, comprising a rotating torus ring surrounding said body, the opposite sides of said torus ring being provided with a resilient surface in contact with opposite sides of said body to produce a helical motion of the same, means for maintaining the axis of said torus ring in a fixed relationship with the axis of said body, and means for supporting said body to permit helical motion thereof.

2. A helical feed device for a cylindrical body, comprising a frame, an annularly divided torus ring pivoted in said frame and adapted to be moved about a vertical axis, means for rotating the inner annulus of said ring, said ring surrounding said body and having opposite sides provided with a resilient surface in contact with opposite sides of said body to produce a helical motion of the same, means for supporting said body to permit helical motion thereof, and means to move said torus ring vertically with regard to the axis of said body to regulate the helix angle of said helical motion.

WILLIAM R. POSTLEWAITE.